3,325,396
HYDROCARBON HYDROCRACKING PROCESS WITH THE USE OF A CATALYST PRODUCED BY CHEMISORPTION OF NICKEL FLUORIDE ON ACTIVE SILICA-ALUMINA
Robert H. Lindquist, Berkeley, Calif., assignor to Chevron Research Company, San Francisco, Calif., a corporation of Delaware
No Drawing. Filed Feb. 4, 1966, Ser. No. 525,153
5 Claims. (Cl. 208—111)

This application is a continuation-in-part of Ser. No. 443,175, filed Mar. 26, 1965, which was a continuation-in-part of Ser. No. 220,086, filed Aug. 28, 1962, which, in turn, was a continuation-in-part of Ser. No. 30,070, filed May 19, 1960, all now abandoned.

This invention relates to an improved method for the catalytic conversion of hydrocarbon distillates and petroleum residua and for the upgrading of a variety of petroleum fractions into more useful and desirable products. More particularly, the process is one whereby hydrocarbonaceous feeds are catalytically converted to more valuable products falling below the initial boiling point of the feeds.

Scott Patent 2,944,006 discloses a low temperature process for hydrocracking low nitrogen content petroleum fractions into higher value products. In such process the catalyst can be used for long on-stream periods without regeneration, relatively small amounts of light gases in the methane to propane range are produced and the lower boiling gasoline fraction of the product has a higher octane number. The present invention concerns a still further improvement in low temperature hydrocracking. Not only are the other desirable features of the prior low temperature hydrocracking process retained, but the present process is capable of being run at even lower temperatures and pressures and longer on-stream periods. Deleterious side reactions are suppressed even further so that less light gases are produced. The present process employs a catalyst which combines low sensitivity to fouling with high activity. The catalyst has an unusually high metal surface area per unit of metals, and hence, the process can be applied to feeds with somewhat higher concentrations of nitrogen and the like.

In accordance with the present invention, the hydrocarbon conversion process comprises contacting a petroleum feed, along with at least 1500 s.c.f. of hydrogen per barrel of said feed with the consumption of at least 500 s.c.f. of hydrogen per barrel of feed converted to lower boiling products, at more than 350 p.s.i.g. hydrogen partial pressure and below 800° F. at more than 0.2 v./v./hour liquid hourly space velocity over a nickel fluoride silica-alumina catalyst composed of nickel fluoride chemisorbed on an active silica-alumina cracking support by contacting said support with the alumina in a substantially dehydrated state with an aqueous solution of nickel fluoride. The contact between the active silica-alumina cracking catalyst support and the aqueous nickel fluoride solution is continued until the support retains, on a dry weight basis, about 1 to 40%, preferably above 3% by weight of nickel fluoride. Preferably the nickel fluoride-containing cracking catalyst is sulfided before use in the hydrocracking process. It has been found that catalysts prepared in this manner, and as described more specifically hereinafter, are especially effective in converting petroleum distillates and other hydrocarbon fractions to lower boiling products. Moreover, these results are obtained with high per pass conversions at relatively low temperatures and for long periods of time without catalyst fouling. Feed components normally difficult to hydrocrack without excessive production of light gases are hydrocracked selectively to valuable products by means of the present process. The low catalyst fouling rate resulting from the use of the present fluoride-containing catalyst is surprising since fluoride-containing catalysts usually foul rapidly in low temperature hydrocracking.

Apparently, this unobvious effect results from simultaneously introducing the fluoride with the nickel ion through chemisorption of the metal fluoride on a silica-alumina cracking support which is in a substantially dehydrated state. The pH of the aqueous solution of metal fluoride remains essentially unchanged during the chemisorption. In prior methods, fluorine is used to acidize a support lacking sufficient cracking activity, the fluoride usually being added by treatment with aqueous hydrofluoric acid or anhydrous hydrogen fluoride or with compounds decomposable to hydrogen fluoride and the fluoride in the final catalyst composition being water soluble. In the present method the fluoride is introduced with the metal ion and the support is not attacked or corroded as in Pier et al. Patent 2,154,527. Further, the nickel becomes strongly bound to the alumina as contrasted to prior methods whereby the metal ion is deposited on the support by decomposition.

The feeds which are usefully employed in the process of the present invention are petroleum fractions, including hydrocarbon distillates which boil within ranges above 200 up to 1100° F. and petroleum residua boiling above 1050° F. Representative hydrocarbonaceous feeds include those generally defined as light and heavy naphthas, kerosenes, light and heavy gas oils, light and heavy coker distillates, and light and heavy catalytic cycle oils and the like. Various of these feeds are of straight run origin while others are recovered as distillate fractions from various processing units such as cokers or other cracking units of the thermal or catalytic variety. Other appropriate feed stocks comprise effluent portions boiling above about 300–325° F. as obtained from a catalytic reforming unit, such as stocks being conventionally produced by passing straight run, thermally cracked and/or catalytically cracked naphthas along with added hydrogen over a platinum on alumina catalyst, or a molybdena-alumina catalyst, under reforming conditions. Still other suitable feed stocks include concentrates rich in aromatic hydrocarbons as obtained by extraction of various hydrocarbon fractions with sulfur-dioxide, furfural, mixtures of various polyethylene and polypropylene glycols or the like. Also to be mentioned are hydrocarbon fractions derived from shale, gilsonite or other natural sources.

Feeds of the type described above normally contain a substantial proportion of nitrogen-containing impurities, along with those of sulfurous character. While a particular feature of the present invention is that feeds having nitrogen contents higher than heretofore found suitable with prior low temperature hydrocracking catalysts may be processed, the feed preferably contains less than 50 parts per million of total nitrogen, and more preferably, below 10 parts per million. Accordingly, as the first step in the process when dealing with feeds having nitrogen contents above such relatively low levels, the feed is subjected to a hydrofining treatment to reduce the nitrogen content thereof, preferably as indicated above, to a level of 0 to 10 p.p.m. expressed as total nitrogen. Sometimes, in combination with the present low temperature hydrocracking process, the hydrofining step can include a minimum amount, such as 25 to 30% of hydrocracking. Any of the known sulfur-resistant hydrogenation catalysts may be used in the hydrofining step.

As previously indicated, the catalyst employed in the present improved low temperature hydrocracking process is a multifunctional catalyst composition comprising nickel fluoride disposed on a siliceous alumina support, which catalyst composition is made by contacting a substantially dehydrated, silica-alumina active cracking catalyst with an aqueous solution of nickel fluoride and subsequently sulfiding. An especially desirable catalyst giving even less fouling comprises a sulfided nickel fluoride which catalyst is prepared by sulfiding a silica-alumina active cracking support having nickel fluoride chemisorbed thereon and being free of water-extractable fluoride.

The silica alumina catalyst support can be any synthetic or natural siliceous alumina composition of acid character which is effective for the cracking of hydrocarbons. The siliceous alumina support, before addition of the nickel fluoride, should contain at least about 5%, and preferably at least 10%, by weight of alumina calculated as $Al_2O_3$. From the cracking activity standpoint, the siliceous alumina support for the catalyst in its preferred form should be one having a "Cat. A" activity of at least 25 as measured by the method of J. Alexander and H. G. Shimp, National Petroleum News (1944), vol. 36, page R–357, and of J. Alexander proceedings, Am. Pet. Inst. (1957), vol. 27, page 51. Alternatively, the support should have a quinoline number of at least 20, according to the method of Mills, Boedeker and Oblad described in J. Am. Chem. Soc., 72, 1554 (1950). Illustrative of the preferred siliceous alumina cracking catalyst supports are synthetic silica-alumina, silica-alumina-zirconia and silica-alumina-magnesia catalysts. Other suitable supports include synthetic aluminosilicates such as the synthetic chabazites (commonly referred to as "molecular sieves") and other zeolitic aluminosilicates such as those described in U.S. Patents 2,882,243, 2,882,244, 3,130,006, 3,130,007 and 3,140,249. A preferred active siliceous alumina cracking support for use in a catalyst of this invention is comprised of a synthetically prepared composite of silica and alumina containing from about 10 to 40% by weight of the alumina component. Any of the several known methods can be used for preparing these siliceous alumina cracking supports. The alumina-silica support however formed must be substantially dehydrated (i.e., "activated") before contact with the aqueous nickel fluoride solution. Thus, rather than the so-called dried hydrogels which are not satisfactory for the purpose of the present invention, the silica-alumina support must have the alumina content converted to the substantially dehydrated forms such as are known as gamma, eta, beta, theta and chi aluminas by exposure to calcining temperatures. Thus, the various silica-alumina hydrogels or like materials prepared as described above are not only first dried, but also are subjected to high temperatures in the range of at least 800° F. up to about 1500° F. for a sufficient time to remove both physically held water and most of the chemically bound water and to leave the surface substantially dehydrated, i.e., only slightly hydrated with chemically bound water, preferably to the extent of 3 to 10 weight percent. Ordinarily, 2 to 5 hours at 800° F. in a dry atmosphere is sufficient for this purpose, with shorter times being used for the higher temperatures. Such high temperature treatment results in a substantially dehydrated silica-alumina support wherein the alumina is in the "activated" alumina form. Preferably, such silica-aluminas will have a high surface area of at least 300 m.²/g. (as measured by nitrogen absorption according to the method of Brunauer et al. described in J. Am. Chem. Soc., 60, 309 (1938). Since in zeolitic crystalline aluminosilicates the alumina has been converted from the hydrated oxide, such compounds are also suitable supports.

Generally, the preferred activated silica-alumina cracking catalyst support is contacted for an appreciable time period with an aqueous solution of nickel fluoride sufficient to give the product a nickel content of at least 1%, up to about 40%, and preferably in the range of 3 to 30% by weight, along with a fluoride content of about 40 to 60% of that of the nickel content, both on a dried catalyst basis. The amount of nickel fluoride employed is preferably at least five times, and more preferably at least 10 times, the amount contained in one pore volume (calculated for the particular alumina-silica support being used and the amount thereof) of a saturated solution of nickel fluoride. Such amounts of nickel fluoride can be obtained either by using large volumes of nickel fluoride solution, or having in contact with the aqueous solution of nickel fluoride a sufficient amount of solid nickel fluoride to keep the solution saturated, or both. Since nickel fluoride has a relatively low solubility, it is usually more desirable to use an excess of solid nickel fluoride over the amount which will saturate the water employed. The amount of water is preferably sufficient to cover the volume of silica-alumina catalyst support employed and also to provide room for agitation to aid the contacting and dissolution of the nickel fluoride solid. If desired, the excess solid nickel fluoride can be separated from the catalyst support by means of a porous plate or filter. In general, at least enough water is present to bring about the chemisorption of the nickel fluoride onto the silica-alumina support under the contacting conditions employed. Enough nickel fluoride should be present to give the desired nickel content in the final dried nickel fluoride silica-alumina catalyst.

Further, the activated silica-alumina catalyst support is kept in contact with the nickel fluoride solution until the desired amount of nickel fluoride becomes associated with or bound in the support. This contacting step may be conducted at room temperature, and where the silica-alumina catalyst support is spray-dried such as 100 mesh particles, contacting for at least 3 hours at room temperature will be satisfactory. Where the support is very finely divided such as a powder, somewhat less time can be used. With higher temperatures, shorter times can also be used; for example, at 140° F. two hours are sufficient for up to about 20% nickel with spray-dried 100 mesh particles of silica-alumina. Longer times are allowed for obtaining higher metal contents in the support; for example, with about three days' contact with adequate agitation between powdered, calcined silica-alumina and a saturated nickel fluoride solution at room temperature, the catalyst can contain about 40% Ni and about 23% F. Longer contact times are also used when the activated alumina-silica support has larger particle size. The silica-alumina support is preferably finely divided to a particle size below about 50 mesh in order to obtain more uniform dispersion of the metal throughout the support, particularly for added nickel contents have 10% by weight. The higher metal fluoride content catalysts obtained by this treatment retain most of the added fluoride. Hence, the catalysts can have fluoride contents upwards from 10% which are higher than obtainable by nickel nitrate impregnations plus HF treatment.

The treating solution of nickel fluoride is essentially only nickel fluoride or nickel fluoride in combination with other metal fluorides and water. Sometimes a plurality of fluorides are desirably used; thus, antimony fluoride can be added to the treating solution, whereby the final catalyst contains nickel antimonide, which catalyst can be used without sulfiding for hydrocracking because the antimonide appears to provide sintering resistance.

After contacting the silica-alumina catalyst support with the nickel fluoride solution for sufficient time, the excess solution may be decanted from the treated silica-alumina support. Usually, the resultant nickel fluoride silica-alumina catalyst is then dried at relatively low temperatures (i.e., 250–500° F.). In some instances, the catalyst may be further treated such as by addition of other components, such as shown in Example 6 of my Patent 3,140,925. Sometimes the dried catalyst is further heated in air.

Preferably, the catalyst before sulfiding is freed of any small amount of water-extractable fluoride in accordance with my copending application 380,148, filed July 3, 1964, now Patent No. 3,239,450. Such catalyst has a higher hydrocracking activity, and hence can be used at lower temperatures. Since nickel sulfide hydrocracking catalysts containing water-extractable fluoride, such as nickel catalysts treated with HF, BF$_3$ or the like, have high deactivation rates, it is surprising that the preferred catalysts with substantially no water-extractable fluoride content in comparison will give lower fouling rates and can be used in the hydrocracking process for longer periods without deactivation. Optionally, the dried nickel fluoride silica-alumina catalyst can be directly sulfided. However, in a preferred procedure whereby the sulfiding temperature can be kept relatively low and the more active catalysts are obtained, the dried nickel fluoride silica-alumina catalyst is first subjected to a reducing atmosphere at temperatures of about 800–1100° F., for example, for 3 to 10 hours, preferably above about 850° F. for at least 4 hours. For example, the nickel fluoride silica-alumina catalyst resulting from the contacting of the silica-alumina support with the nickel fluoride solution is dried for 10 hours at temperatures of about 250° F. and then heated in a stream of hydrogen for 5 to 6 hours at 900° F.

Thereafter the nickel fluoride silica-alumina catalyst is preferably sulfided with a gaseous sulfiding agent under sulfiding conditions. It can be contacted with hydrogen sulfide or with hydrogen and an organic sulfide at temperatures below about 750° F., and preferably below 700° F. For example, the sulfiding treatment can be effected at 1200 p.s.i.g. and 550–600° F., with hydrogen present in the amount of about 8000 s.c.f. per barrel of feed which can be made up of mixed hexanes containing, for example, 10% by volume of dimethyl disulfide. Alternatively, other sulfur compounds, such as hydrogen sulfide or carbon disulfide, mercaptans or other organic sulfides or disulfides can be used. Likewise, the sulfiding can be effected by contacting the catalyst with petroleum feed containing sulfur compounds.

In the preparation of the catalyst, preferably after drying the nickel fluoride silica-alumina but before heating in a reducing atmosphere and sulfiding, the catalyst is transformed to the desired shape. The catalyst can be used in the form of catalyst beads, extrudates or other particle shapes. When the support has been treated in the preferred finely divided form, the resulting treated support is desirably converted into pellets or other larger size particles. Before final shaping, the nickel fluoride silica-alumina may be admixed with, or dispersed in, other catalytic materials or catalyst supports. The catalyst and the method of preparation above described are set forth in further detail and claimed in my application Ser. No. 30,373, filed May 19, 1960, now Patent 3,140,925.

With many hydrocracking catalyst which are composed of iron transitional group metal hydrogenating components, the activity of the catalyst is increased by thermactivation treatment involving passing a dry, nonreducing gas through a mass of particulate catalyst at a rate of at least 10 cu. ft. per hour per cu. ft. of catalyst at temperatures of 1200–1600° F. for times ranging from 0.25 to 48 hours. Therefore, it is surprising that with the present catalyst prepared by chemisorption of a fluoride of an iron group transition hydrogenating metal, the activity as well as the resistance to fouling is further improved by subjecting the catalyst, usually after shaping and partial drying, as a preferred procedure to calcination in an atmosphere containing at least 10% steam for at least one hour at 850–1100° F. Preferably the calcining atmosphere contains 25–90% steam and the temperature is 900–1000° F. Preferably the catalyst is calcined with steam for 2–10 atmosphere-hours (i.e., the partial pressure of steam in atmospheres times the hours). Most especially the steam calcination is continued until the catalyst bulk density is at least 0.5 (gms./cc.), preferably at least 0.65. During the high temperature water vapor treatment some rearrangement of the catalytic surface apparently occurs and results in increased activity and decreasing fouling rate. This steam calcination procedure is described in more detail in application Ser. No. 525,122 filed by me and another concurrently herewith and entitled "Improved Fluoride Catalyst."

In a preferred embodiment of the process of the present invention, the reactor, after being charged with catalyst and the catalyst prepared for fixed bed operation, is operated under pressure ranging from about 400 p.s.i.g. up to about 3000 p.s.i.g., preferably below 2500 p.s.i.g., and at average catalyst temperatures in the range of 400° F. to about 750° F., preferably below 700° F., with the temperature usually being so regulated as to initiate the conversion reaction at as low a temperature as possible. The petroleum feed stock is introduced in admixture with at least 1500 s.c.f. of hydrogen per barrel of total feed. At least 500 s.c.f., and normally from about 1000 to 2000 s.c.f., of hydrogen are consumed in the hydrocracking reaction zone per barrel of total feed converted to products boiling below the initial boiling point of the fresh feed. Generally, the feed as obtained, for example, from a hydrofining step, is introduced into the hydrocracking reaction zone at a liquid hourly space velocity (LHSV) of from about 0.2 to 5 volumes of hydrocarbon (calculated as liquid) per superficial volume of catalyst with a preferred rate being from about 0.5 to 3 LHSV. The conditions of temperature, pressure and space rate are preferably such that at least 20 volume percent of feed to the hydrocracking reactor is converted per pass to products boiling below the initial boiling point of said feed. Preferably, the reaction conditions are adjusted such that the per pass conversion to lower boiling product is in the range of from 30 to 80% although the conversions with these active catalysts can be higher when the temperature is allowed to rise. Usually it is preferred to operate the hydrocracking process at a selected per pass conversion while periodically increasing the reaction temperature so as to maintain the selective per pass conversion at a relatively constant level. When the feed contains appreciable amounts (i.e., 10–1000 p.p.m.) of organic nitrogen compounds, it is preferable to initially titrate the catalyst with ammonia to the substantial exclusion of fouling by organic nitrogen compounds and to hydrocrack the feed with the resulting titrated catalyst while continually raising the temperature as necessary to maintain a satisfactory conversion and to maintain the ammonia adsorbed on said titrated catalyst in equilibrium with the ammonia produced from the nitrogen compounds on the feed. Alternately with feeds containing these higher amounts of nitrogen compounds, it is sometimes desirable to increase the operating pressure rather than to rely solely on temperature increases to maintain the conversion at a satisfactory level. Increasing pressure is more effective for this purpose in the present process as compared to hydrocracking processes using other catalysts.

It is preferred that, even though the catalyst has been sulfided, the feed have a sulfur content of at least 10 p.p.m., preferably above 50 p.p.m., particularly where the feed is a relatively low boiling hydrocarbon such as naphthas boiling in the range of 160–450° F. By maintaining the sulfur content above this minimum the catalyst life is extended, especially for naphtha feeds as described in application Ser. No. 525,150 filed by me and Clark J. Egan concurrently herewith and entitled, "Naphtha Hydroconversion."

One of the most advantageous aspects of the subject hydrocracking process is that the reaction temperature is maintained below 800° F. and preferably below 700° F. during a major portion of the catalyst on-stream period. As indicated above, the nickel fluoride silica-alumina catalyst prepared as described above permits the temperature to be desirably initiated at very low temperatures consistent with maintenance of adequate per pass conversion levels. For any given conversion, the permissible starting temperature is a function of the catalyst activity, and the more active catalysts described herein permit the hydrocracking reaction at lower starting temperatures for a given per pass conversion than would otherwise be the case. In any event, the hydrocracking reaction is preferably initiated below about 700° F., with the most preferred initiating temperatures being in the range of from 400 to 650° F. With the sulfided nickel fluoride silica-alumina catalysts of high nickel contents, such as above 20 weight percent Ni, it may be desirable to initiate the reaction at the lower range of these temperatures and even below 400° F., particularly with low nitrogen content feeds. Initiation of operations at low temperature usually results in long catalyst on-stream periods before the catalyst needs to be regenerated or replaced. Catalysts of the present invention have their nickel fluoride content dispersed to a high degree. Further, not only do such catalysts have a very high surface area for each unit of weight of the nickel component, but also, the total surface areas of the present catalysts are larger than with catalysts of similar empirical composition prepared by other methods. The extraordinarily high degree of dispersion for the nickel in the present catalysts is shown by the following comparison wherein CO chemisorption values (as measured by the method described by T. R. Hughes, R. P. Sieg and R. J. Houston in ACS Petroleum Division Preprints, vol. 4, No. 2, page C–33 (1959)), are used to measure the surface area of the nickel: a catalyst prepared from silica-alumina particles by the prior art methods of impregnation with nickel nitrate solution and subsequent treating with hydrofluoric acid had a nickel content of 11% by weight and 5.6% F. and absorbed 220 micromoles of CO per gram of nickel. A second catalyst prepared from similar silica-alumina particles in accordance with the presence invention had about the same percentages by weight of nickel fluoride, namely, 10.3% Ni and 5.4% F. The second catalyst chemisorbed 500 micromoles CO per gram of nickel, indicating a degree of dispersion for the nickel of more than twice as great as that for the first catalyst. This substantial increase in nickel surface is highly desirable because of its direct correlation with catalyst activity. In view of this greater dispersion of nickel and greater nickel surface area, the catalyst is less likely to become completely fouled and deactivated as soon as other catalysts of similar nickel content such as prepared by impregnations with nickel nitrate. Thus, the catalyst used in the present process has a higher surface per unit mass of nickel, which is due to the highly subdivided nature of the nickel in the catalyst. Such characteristic permits the formation of catalysts with higher metal contents without relative loss of surface area, whereas with higher metal content catalysts prepared by impregnation, the metal concentrates in larger clumps, resulting in lower surface areas and relatively lower activity. As compared to hydrocracking processes using catalysts having lower surface area for the hydrogenating metal component, the process of the present invention can be run either at lower temperatures for longer periods with the extremely low nitrogen content feeds or at the same temperatures with higher nitrogen content feeds for the same period of time. Another advantage of the present process is that usually lower pressures may be used.

More specifically, the fouling rate of the catalyst determines the length of useful life of the catalyst. Since, when running at a constant space velocity and pressure, the temperature must be raised to maintain the conversion constant, the fouling rate can be expressed in terms of temperature rise per unit of time, i.e., degrees per hour. Normally for a denitrified standard feed such as that described below for the activity test, and for a space velocity of 1.0 LHSV and a conversion of 60% per pass, the fouling rate of the present catalysts will be below about 0.1° F./hour, and often, ⅓ of this value. Such low fouling rates result in long, useful on-stream periods, such as, for example, over 3,000 hours for a fouling rate of about 0.05° F./hour.

As indicated above, the catalysts employed in the present low temperature hydrocracking process are further characterized by high activity, as compared to similar catalysts prepared by other procedures. The activities of catalysts for such purpose can be tested by determining their ability to convert a selected standard hydrocarbon feed stock to products falling below the initial boiling point of said stock. In testing a catalyst to determine its activity index, a hydrofined cycle oil test stock, along with 8000 s.c.f. $H_2$ per barrel of feed, is passed through a mass of catalyst (65 ml. were actually employed) at a liquid hourly space velocity of 2 and at a furnace temperature of 550° F., the actual feed rate employed being 130 ml. per hour. The run is continued for 14 hours under these conditions, with product samples being collected at about two-hour intervals. These samples are allowed to flash off light hydrocarbons at ambient temperature and pressure, following which a determination is made of the API gravity of each sample. From the average API gravity of the samples taken from each run is determined the API gravity rise, that is, the API gravity of the product sample or samples minus the API gravity of the feed. This is a rapid and convenient method of characterizing the catalyst which correlates smoothly with conversion. The API gravity rise is referred to as the activity index of the catalyst.

A sulfided nickel fluoride silica-alumina catalyst showing activity indices of 41.6 and 45.0 in duplicate runs in the above-described test, and hence, having the ability to give high conversions at relatively low temperatures, was obtained in the following manner: a calcined silica-alumina catalyst in spray-dried, powdered form and containing 25% alumina and having a pore volume of 0.8 cc./g. was contacted with stirring for 78 hours with a saturated aqueous solution of nickelous fluoride at a ratio of 2 volumes of catalyst to 15 volumes of the solution. The treated catalyst was filtered and then washed three times with distilled water. After drying for 16 hours at 300° F., the catalyst contained 29.8 weight percent Ni and 19.3% F. The product was pelleted with the aid of a small amount of hydrogenated vegetable oil, oxidized in air at 950° F. for 4 hours to drive off the vegetable oil, then subjected to an atmosphere of hydrogen for 6 hours at 900° R. and thereafter sulfided with a mixed stream of hydrogen and dimethyl sulfide. As indicated, the catalyst so prepared is suitable for hydrocracking hydrocarbon distillates at high conversions per pass at low temperature conducive to selective production of valuable products.

Since with catalysts of high activity and low fouling rate the catalyst on-stream periods are so long, it is generally more economical to merely replace finally deactivated catalyst with fresh catalyst. However, because of the higher initial activity of these catalysts, more regenerations than with less active catalysts are possible before ultimate reduction of the activity to an unsatisfactory level. Regenerations are normally carried out, for example, by contacting it with an oxygen-containing gas at a temperature within the range of 700–1000° F., and then resulfiding. As contrasted to other fluoride-treated catalysts, which show large fluoride losses during regeneration, the nickel fluoride catalysts of the present process do not lose appreciable amounts of fluoride when regenerated. For example, a nickel fluoride catalyst prepared according to this invention and containing 5% fluoride lost no fluoride upon being subjected to reduction in hydrogen for 4 hours at 900° F., or upon being treated in air at 900° F. for 24 hours.

The following examples are presented to illustrate preferred embodiments of the low temperature hydrocracking process of the present invention. (All percentages are by weight unless otherwise specified.)

*Example 1*

A sulfided nickel fluoride catalyst was prepared by contacting 1 volume of powdered silica-alumina catalyst (containing 25% alumina and calcined at 800° F.) with 30 volumes of an aqueous saturated solution of nickel fluoride. After standing overnight, the solution was decanted from the solid catalyst and the solid filtered from the remaining solution. The solid was then dried at about 300° F. for 3 hours. Analysis of the catalyst showed 23% Ni and 9% F. Thereafter, the catalyst was prereduced with hydrogen at 900° F. for 3 hours.

Then the catalyst was placed in a reactor, and hydrogen at ambient temperature and pressure was passed through the reactor with the temperature gradually being raised to 550° F. At this point the pressure was raised to 1200 p.s.i.g. and the hydrogen stream admixed with normal decane containing 2 volume percent of dimethyl disulfide at 550° F., initially with the proportion of hydrogen and dimethyl disulfide being adjusted to give the equivalent of 0.6% of $H_2S$ in the gas. With the start of the sulfiding of the nickel, the temperature quickly rose to 560° F. and remained there for the remainder of the period of 4½ hours, during which, the n-decane contained dimethyl disulfide. The conditions during this period was as follows:

| | |
|---|---|
| Average catalyst temperature ° F__ | 560 |
| Pressure p.s.i.g__ | 1185 |
| $H_2$/feed (mole ratio) | 9.6 |
| $H_2$ rate (s.c.f./b.) | 6500 |
| Space rate (LHSV) | 8.0 |
| Residence time (sec.) | 14.7 |

Then, after passing hydrogen over the catalyst to sweep out excess dimethyl disulfide, pure normal decane was passed over the sulfided nickel fluoride silica-alumina catalyst. The temperature varied from 551° F. to 569° F. during the first hour, the other conditions for the reaction being as follows:

| | |
|---|---|
| Pressure p.s.i.g__ | 1185 |
| $H_2$/feed (mole ratio) | 9.2 |
| $H_2$ rate (s.c.f./b.) | 6300 |
| Space rate (LHSV) | 8.0 |
| Residence time (sec.) | 15.3 |

During this period, the conversion was 91.3 weight percent to material boiling below n-decane, of which material, 93.6% boiled above propane and 75.5% consisted of $C_4$ to $C_7$ isoparaffins.

On the other hand, with a catalyst prepared by impregnating an alumina-silica support with nickel nitrate to about the same nickel content as the above catalyst, and sulfiding, the activity of such catalyst will be lower than the above sulfided nickel fluoride catalyst, and hence, will have to be used at a higher temperature for the same percentage conversion of the normal decane feed. Since the proportion of isoparaffins to normal paraffins produced in the reaction from normal decane is less at higher reaction temperatures (for example, 50% less isoparaffins at 650° F. than at 550° F.), the nickel nitrate derived catalyst will give at the same conversion level considerably less isoparaffins in the product than the result obtained above with a sulfided nickel fluoride catalyst.

*Example 2*

A calcined silica-alumina catalyst in spray-dried, powdered form (containing 25% alumina and having a pore volume of 0.8 cc./g.) was contacted with stirring for 78 hours with a saturated aqueous solution of nickelous fluoride at a ratio of 2 volumes of catalyst to 15 volumes of the solution. The treated catalyst was filtered and then washed three times with distilled water. After drying for 16 hours at 300° F., the catalyst had a nickel content of 29.8 weight percent and fluoride content of 19.3 weight percent. The catalyst so prepared was placed in a glass reactor and prereduced 3 hours at 800° F. by passing a stream of hydrogen over the catalyst at the rate of 4 cu. ft./hr. and atmosphere pressure. Then the catalyst was treated for 1 hour at 570° F. and 1200 p.s.i.g. and exposed to dimethyl sulfide added to the hydrogen stream to give the equivalent of 2% of $H_2S$ in the gas. This sulfiding treatment was continued until there was an amount of sulfide equivalent to 2.1 theories of $H_2S$, based on $Ni_3S_2$. The catalyst was then employed for hydrocracking of a hydrofined light cycle oil having the following inspections:

| | |
|---|---|
| Gravity, ° API | 30 |
| Aniline point, ° F. | 93 |
| Nitrogen (basic), p.p.m. | 0.2 |
| Aromatics, vol. percent | 48 |
| Olefins, vol. percent | 1 |
| Paraffins, vol. percent | 51 |
| ASTM distillation (D-158): | |
| Start | 357 |
| 5% | 420 |
| 10% | 434 |
| 30% | 460 |
| 50% | 476 |
| 70% | 493 |
| 90% | 519 |
| 95% | 532 |
| End point | 570 |

The reaction conditions were 6500 s.c.f. hydrogen per barrel of feed, 1200 p.s.i.g. total pressure and a space velocity of 1.0 LHSV, with the temperature being varied between 560° F. and 600° F. to give approximately 60% conversion of feed to product boiling below 400° F. After 140 hours the temperature had been raised to about 590° F. Thereafter, the run was continued an additional period (to a total of 322 hours) within which the temperature for 60% conversion per pass varied between 590° F. and 600° F. This indicated a very good resistance to fouling, requiring only about 0.05° F. temperature increase per hour to maintain 60% conversion. The product during the latter period had a gravity of about 46° API and an aniline point ranging from 108–114°, which shows that very little aromatic ring saturation occurred.

*Example 3*

In a run similar to Example 2 and with the same catalyst, except that it was prereduced at 900° F., the temperature at 60% conversion leveled out after 30 hours on stream at about 550° F. and remained there until the run was terminated at 70 hours. In this run the catalyst fouling observed was even less than in the latter part of the run in Example 2. The product had an aniline point of 117° F. and a gravity of about 46° API.

Other test runs were made with similar feeds and catalysts prepared by chemisorbing nickel fluoride on silica-alumina and then sulfiding. In one such run the catalyst had an undetectable fouling rate after 200 hours on stream.

These runs illustrate that excellent conversions of hydrocarbon feed to highly desirable products can be obtained with the present catalysts for very long periods of time, from hundreds to thousands of hours. In contrast, fluoride introduced into the catalyst separately from the metal, as in prior methods, causes fouling of the nickel sulfide silica-alumina catalyst when used in a hydrocracking process. Thus, fluorided and sulfided nickel on silica-alumina catalysts prepared by impregnating with nickel nitrate and treating with hydrogen fluoride gave much higher fouling rates. For example, such a catalyst prepared by nickel nitrate impregnation of silica-alumina beads to a 10.8% nickel content, treated with aqueous HF and then calcined at 800° F. before sulfiding, gave a fouling rate of about 0.40° F./hr. (i.e., required such temperature increase to maintain conversions) when used with the feed and under the conditions set forth in Example 3 above. With a catalyst prepared by impregnation of silica-alumina beads with nickel nitrate to a nickel content of about 25%, and then fluorided before sulfiding, the fouling rate was even higher.

Example 4

A sulfided nickel fluoride catalyst was prepared by contacting with stirring at room temperature for 78 hours one volume of powdered calcined silica-alumina cracking catalyst containing 25% of alumina with eight volumes of water containing powdered nickel fluoride tetrahydrate in a proportion of 6.23 parts by weight of nickel fluoride tetrahydrate to 8 parts of silica-alumina. Thereafter the catalyst was dried at 300° F. for 12 hours. The resulting catalyst powder was formed into 3/16 inch tablets which were then crushed to 8–14 mesh particles. These particles were calcined in air for 4 hours at 900° F., reduced in hydrogen at 900° F. for 4 hours and then calcined in air containing 13% steam for 24 at 900° F. The catalyst had the following properties: 18% Ni, 5% F, 284 m.$^2$/gm. surface area and a bulk density of 0.76.

The catalyst was then placed in a reactor and pre-sulfided with four theories of ethyl mercaptan in hexane (a theory of sulfiding agent is equivalent to the stoichiometric amount required for conversion of all the nickel present to $Ni_3S_2$).

Sulfur-free n-heptane along with hydrogen (at a mol ratio of hydrogen to heptane of 12:1) was passed through the catalyst at a heptane space velocity of 1.5 LHSV at an initial temperature of 586° F. The conversion to lower boiling products initially was 89%. While maintaining the temperature at 586° F. and doubling the hydrogen/heptane ratio, the conversion dropped to 83% after 5 hours and to 50% in 30 hours. The temperature was then raised to 601° F. at 32 hours at which time the conversion was 61% but at 48 hours had dropped to 32%. This decrease in conversion indicated a substantial decrease in activity of the catalyst. At 52 hours the catalyst temperature was raised to 632° F. at which time the conversion was 58%. Thereafter the n-heptane feed was discontinued and the hydrogen was continued for 68 hours after which period n-heptane was reinjected and conversion then at 126 hours was 35%. At 146 hours, with the temperature still at 632° F., introduction of dimethyl disulfide with the feed was started at a rate to give a concentration of 190 p.p.m. of sulfur in the heptane feed. After an additional 24 hours, the conversion due to the effect of the added sulfur had risen to 48%. At 173 hours (the sulfur addition continuing) the temperature was raised to 660° F. at which point the conversion became 71%. After an additional 48 hours the conversion was still high at 69%, i.e., essentially constant.

Example 5

Another test was conducted on a once-through basis using the same catalyst as in Example 4 and a naphtha feed having a distillation range of 215° F. start, 252° F. 50% point, and 322° F. end point, a composition of 68% paraffins, 21% naphthenes, and 11% aromatics, and a sulfur content of 140 p.p.m. The naphtha feed together with hydrogen at a rate of 6200 s.c.f. of $H_2$ per barrel of feed was passed through the catalyst at 1.5 LHSV and 1205 p.s.i.a. and 580° F. The conversion to products boiling below $C_7$ was 75% at the start and was 74% after 77 hours on stream. This test also illustrates that high conversions can be obtained with essentially no catalyst fouling.

Example 6

A sulfided nickel fluoride silica-alumina catalyst was prepared by contacting with stirring at room temperature for 48 hours one volume of powdered calcined silica-alumina cracking catalyst (25% alumina) with eight volumes of water containing powdered nickel fluoride tetrahydrate (6.23 parts by weight per 8 parts of silica-alumina). After decanting the remaining aqueous solution, the catalyst was dried at 150° F. for 16 hours, and formed into 3/16 inch tablets. The tablets were crushed to 8–14 mesh particles and calcined in air for 4 hours at 900° F., reduced in flowing hydrogen at 900° F. for 4 hours and then calcined at 900° F. for 21 hours in air containing 13% steam. The catalyst had the following properties: 18.9% Ni, 8.5% F, 247 m.$^2$/gm. surface area and 0.77 bulk density. The catalyst was then placed in a reactor and sulfided as the catalyst in Example 1. Naphtha feed was passed through the catalyst at 0.75 LHSV along with 50 s.c.f. of recycled gases (about 97% hydrogen). The conversion with recycle of high boiling portions of the reaction effluent was run continuously for 790 hours with the other operating conditions varied to maintain a 60% conversion to the recycle cut point as indicated below. For the first 176 hours, the naphtha feed was a napta having a distillation range of 215° F. start, 252° F.—50% point and 322° F. end point, a sulfur content of 140 p.p.m. and an analysis of 68% paraffins, 21% naphthenes and 11% aromatics. After 176 hours, the feed was a similar naphtha having a distillation range of 150° F. start, 222° F.—50% point, 334° F. end point, an analysis of 71.2% paraffins, 18.9 naphthenes and 9.8% aromatics and as sulfur content of 304 p.p.m. In the following table, $C_7+$ recycle cut point indicates that heptanes and higher boiling components were recycled to the reactor and $C_6+$ recycle cut point indicates that hexanes and higher boiling material were recycled.

| Time On Stream (Cumulative Hrs.) | Recycle Cut Point | Total Pressure, p.s.i.g. | Temperature, °F. |
|---|---|---|---|
| 0–106 | $C_7+$ | 1,200 | 590–594 |
| 106–188 | $C_7+$ | 1,600 | 586–594 |
| 188–264 | $C_6+$ | 1,600 | (1) |
| 264–600 | $C_6+$ | 1,600 | 688–700 |
| 600–790 | $C_6+$ | 800 | 670–674 |

[1] Adjusting to higher temperature.

In the period of 264–600 hours the fouling rate was 0.05° F./hour, an extremely low fouling rate for naphtha conversion. In the period of 600–790 hours, the space velocity was decreased to 0.4 when the pressure was changed to 800 p.s.i.g.; in the period the temperature started at 672–674° F. and leveled off at 670° F., indicating no fouling rate under these conditions.

As will be evident to those skilled in the art, various modifications of this invention can be made in light of the foregoing disclosure without departing from the spirit or scope of the appended claims. For example, nickel fluoride can be chemisorbed on crystalline aluminosilicate for use in this invention. Such a preparation is illustrated by the following: an aluminosilicate commercially available from Linde Division of Union Carbide Company, Tonawanda, N.Y., under the trade name "Molecular Sieve 13X" and corresponding substantially to the formula $[6Na_2O.6Al_2O_3.15SiO_2]$ was contacted with a saturated aqueous solution of nickel fluoride for 24 hours at room temperature. After removing the excess aqueous solution, the catalyst was dried and gave an analysis of 16.4% Ni and 9.5% F.

I claim:

1. A catalytic process for selectively converting during a single contact with the catalyst at least 20% of petroleum feed to products boiling below the initial boiling point of said feed, which comprises passing said feed, along with at least 1500 s.c.f. of hydrogen per barrel of said feed with the consumption of at least 500 s.c.f. of hydrogen per barrel of feed converted to lower boiling products, at more than 350 p.s.i.g. hydrogen partial pressure and below 800° F. at more than 0.2 v./v./hour liquid hourly space velocity over a nickel fluoride silica-alumina catalyst composed of nickel fluoride chemisorbed on an active silica-alumina cracking support by contacting said support with the alumina in a substantially dehydrated state with an aqueous solution of nickel fluoride said resulting catalyst having a nickel content of 1 to 40% on a dry weight basis.

2. The process of claim 1 wherein said feed is a hydrocarbon petroleum distillate having a nitrogen content below 50 p.p.m.

3. The process of claim 1 wherein said active silica-alumina cracking support contains 10 to 40% by weight of alumina in a substantially dehydrated state when the nickel fluoride is chemisorbed thereon.

4. The process of claim 1 wherein said catalyst has a nickel content of at least 3% on a dry weight basis.

5. The process of claim 1 wherein said catalyst is sulfided.

References Cited

UNITED STATES PATENTS 3,239,450   3/1966   Lindquist et al. _____ 208—111

DELBERT E. GANTZ, *Primary Examiner.*

A. RIMENS, *Assistant Examiner.*